United States Patent [19]

Alther

[11] 4,242,140
[45] Dec. 30, 1980

[54] ACTIVATION OF CLAYS BY COMPACTION

[75] Inventor: George R. Alther, Ferndale, Mich.

[73] Assignee: International Minerals & Chemical Corp., Terre Haute, Ind.

[21] Appl. No.: 98,101

[22] Filed: Nov. 28, 1979

[51] Int. Cl.³ .............................................. C04B 33/13
[52] U.S. Cl. ..................................................... 106/72
[58] Field of Search ..................... 106/72, 73, DIG. 4, 106/288 B

[56] References Cited

U.S. PATENT DOCUMENTS

| | | | |
|---|---|---|---|
| 3,240,616 | 3/1966 | Harasowski et al. | 106/72 |
| 3,700,474 | 10/1972 | Lang | 106/288 B |
| 3,779,782 | 12/1973 | Erickson et al. | 106/72 |

*Primary Examiner*—James Poer
*Attorney, Agent, or Firm*—H. J. Barnett

[57] ABSTRACT

A method for improving the physical properties of a platey-type clay, which comprises first adding about 1-10% by weight of an activator substance, such as sodium carbonate, sodium hydroxide, lithium carbonate, lithium hydroxide, zinc sulfate, or nickel carbonate, and thereafter compacting the treated clay to obtain improved physical properties, including improved viscosity characteristics, fluid loss and reduction in fines. The process upgrades the properties of poor quality smectite clays so that they can be used in foundry mold-wash binders, drilling muds and water impedance applications, such as for sealing ponds, slurry trenches and sanitary landfills.

18 Claims, No Drawings

ACTIVATION OF CLAYS BY COMPACTION

BACKGROUND OF THE INVENTION

Platey-type clays include low grade "bentonites" which are found throughout the world and, depending on their field-aged condition, have varying levels of desirable physical properties. Most bentonites carry calcium as their most abundant ion. Only a few carry sodium as the dominant ion. An example of the latter is Wyoming bentonite, which is highly colloidal, plastic and swells readily in water to form thixotropic gels.

In general, smectite clays, such as bentonite, include sodium montmorillonite, and such clays have been formed by the alteration of volcanic ash in situ, but many of the clay deposits have been subjected to a geologic history less favorable than that of the Wyoming bentonites, and these lower grade clays do not possess the required physical properties of low fluid loss and higher aged viscosity, to be useful in the various applications in which high quality Wyoming bentonites are now used.

With increasing industrialization in all parts of the world, there is an increasing demand for good quality bentonite-type clays, but the cost of transporting existing supplies of high quality clay to other parts of the world is an economic obstacle. Therefore, it makes more sense to find methods of upgrading the local clay deposits.

PRIOR ART

It is already known that the physical properties of a bentonite-type clay can be upgraded by mechanical working. U.S. Pat. No. 3,700,474 issued to William J. Lang describes a method of compacting fine particles of clay having a maximum moisture content of about 20% by weight of water to make the clay more readily slakable in water. The clay is first ground, and is then compacted under pressure to a sheet form having an apparent density of 60-94%. The clay sheet is then crushed to the desired size. There is no mention in this reference of adding an activator such as sodium carbonate prior to compacting, and thereafter compacting the clay to obtain substantially instantaneous "aging" of the clay with consequent improvement in fluid loss properties.

In the past, it has been common practice to apply sodium carbonate on freshly mined clay, and allow it to set several months for aging. U.S. Pat. No. 2,892,800 describes a method of preparing an activated bentonite from crude low swelling bentonite clay. The steps include contacting the crude clay with hydrochloric acid, then adding water and sulfuric acid, preferably with steam heat and elevated pressure in an autoclave. The activated clay is also washed with steam. The process does not appear to include any physical working step, and the main use of the activated clay is for oil decolorizing and neutralizing of vegetable and animal oils. The process requires added heated energy and more complex treatment than is contemplated by the subject process.

U.S. Pat. No. 3,240,616 describes activating bentonite clays with activators such as sodium carbonate in amounts of up to 22.5% by weight of the mass of the bentonite. This patent states that the activator should be added to the clay directly after mining or during transport by spraying the activator solution directly on the material either on the conveyors at the mine, or in the railway vans. Also described is a method of layering the clay and adding the activator between the layers. The time of contact with the activator is from 1-100 hours, and the patent states that the activator should be applied prior to mechanical working of the clay. This patent also stated that the clay should be first dried prior to any mechanical working. The only improved physical properties which were described were an increase in green compression strength and green permeability. The particular clay which was treated originated in the region of Chmielnik, Poland. This patent makes no mention of a combined treatment including adding an activator, and then compacting the clay prior to drying.

SUMMARY OF THE INVENTION

The subject invention is directed to a method for upgrading the properties of smectite clays to improve viscosity and fluid loss behavior to increase the usefulness of such clays for such applications as oil well drilling muds, foundry binders, and water impedance uses including the sealing of ponds, slurry trenches and sanitary landfills. The improved properties are obtained by the combined steps of first adding a small amount of an activator agent such as soda ash ($Na_2CO_3$) to the dried and finely ground clay, compacting and then regrinding the clay. Clays which may be upgraded by this process include: Black Hills Bentonite, low-grade Wyoming calcium bentonite, Mississippi bentonite, and platey-type clays from New Mexico, Peru, Australia, Greece, Brazil, Argentina, Mexico, New Zealand, India and Canada.

Other platey-type clays can also be improved by the method of the invention, provided they do not contain an excessive amount of impurities such as grit. Such clays include montmorillonites, nontronites and hectorites. For foundry uses, a grit content up to about 15% weight is acceptable. For use as oil well drilling muds, no more than about 3% grit is acceptable.

The improvement in the aged viscosity and fluid loss characteristics of the low grade smectite clays is accomplished by first adding from about 1-10% by weight of an activator salt to the clay. The activator treated clay is then compacted to obtain a clay having improved aged viscosity and fluid loss properties.

API (American Petroleum Institute) standards require that clays used for oil well drilling muds have an aged viscosity of 30 cps at 600 rpm using the Fann viscosimeter. When a clay has an aged viscosity below this level, past practice has been to add polymers and/or sodium carbonate to increase the aged viscosity to about 30 cps. It is, therefore, commercially valuable to upgrade a low grade clay or a calcium based clay to an aged viscosity of at least 15 cps because the viscosity can be further increased by the addition of polymers to the clay. There are some clay uses in which the addition of polymer is undesirable. In some instances, the added polymer has been attacked by microorganisms with consequent decay, and thus loss of added viscosity. In such applications, a clay having a higher aged viscosity should be used to insure permanence.

Preferred activators include soda ash ($Na_2CO_3$), lithium carbonate ($Li_2CO_3$), and nickel carbonate ($NiCO_3$). Other usefule activators include metallic salts such as sulfate and carbonate salts of zinc, lithium and aluminum. Lithium and sodium hydroxide are also useful as activators. Ferric sulfate and sodium chloride may also be used with some clays.

In general, it is presently thought that the improved properties of the particular upgraded clay are due to an internal ion exchange which takes place within the internal structure of the clay. In some clays, the improvement is more pronounced, and certain preferred salts appear to produce better results in "activating", or upgrading certain platey-type clays. At the present time, the process has not been used for upgrading clays having a rod-like or chain structure because it is expected that compacting would disturb the clay structure. Also, certain salts, such as beryllium, barium and calcium carbonate, are not significantly useful for the process of the invention.

At the present time, it is believed that metallic salts which will exchange ions with the clays to enable the clays to absorb water will be useful activators. The salts specifically mentioned above are indicative that the following description of activator salts should apply. Group IA periodic table cations including $Na+$, $Li+$, $K+$ and $Cs+$ in soluble salt form, including carbonates and sulfates are considered useful activators. In Group IIA cations, $Mg++$ in soluble salt form is useful. The transitional metals, $Ni++$, $Zn++$, $Cu++$ and possibly $Co++$ are considered useful. The above cations will most usually be available as carbonate and sulfate salts. In specific instances, $(NH_4)_2CO_3$, $Al_2(SO_4)_3$ and $Fe_2(SO_4)_3$ may be useful activators for certain clays.

The compacting step apparently accelerates and improves the ion exchange which takes place in the clay during activation so that the improvement in the clay's properties is obtained within the very short time required to add the activator and then compact the treated clay. The total process can be completed in less than about five minutes, including a drying step of up to about 1½ minutes. Under prior processes, the minimum drying time disclosed is about 60 minutes, and none of the references show the added effect obtained by combining activation and compaction.

In the conventional prior art process, the activator is added in the field to the stockpiled clay in larger amounts than are required in the subject method, and the clay is allowed to "field age" over long periods of time with some turning and handling to expose all portions of the clay to the action of the activator. All the extra handling and waiting for field aging can be eliminated by the subject process.

DETAILED DESCRIPTION OF THE INVENTION

PROCEDURE

Samples of activated/compacted clays were prepared and compared to unmodified clays and to compacted clays, both for aged viscosity and for fluid loss. The compacted samples were prepared according to the following procedure:

The raw clay sample is first placed in a blender, and sufficient water is added to bring the clay to 12% by weight. Some additional water is added to compensate for processing losses. After all the water is added, the mixture is blended thoroughly. A twin shell blender equipped with a liquid addition/intensifier bar was used.

After blending, the sample is fed through a B-100-A Two Roll Mill, available from K. R. Komarek, Inc., Elk Grove Village, Ill. Operation of the compacting mill follows the manufacturer's instructions provided with the equipment. For the subject compacting, a cylinder pressure of 2200 psi was used, giving a roll pressure of 18,000 psi. The feed screw was set at 6.2, and the foll speed was set at 1.25 (slowest setting).

In the samples which were made according to the invention, the application of activator preceded the above compaction step. The activator was added with water in the blending step, and thoroughly blended to distribute the activator uniformly throughout the clay sample.

The samples were compared for aged viscosity properties using the standard procedures set forth in American Petroleum Institute's method and apparatus publications 13-A and 13-B. A Fann viscometer was used at 300 rpm and 600 rpm. Fluid loss was also determined for the samples following the above API standards.

EXAMPLE I

A Black Hills Bentonite (BHB), uncompacted, was compared to the same clay with activators added, with and without compaction. To make the compacted "BHB" sample, the compaction procedure described above was used. A total of 6388 g of 200 mesh BHB with 323 g (+20 g) added water was prepared. The moisture level of this sample was 11.47%.

To prepare the activated samples, 6503 g of 200 mesh BHB, 360 g water and 131 g soda ash ($Na_2CO_3$) were used in one case to produce on activated clay having 2% added $Na_2CO_3$ at 12% moisture. Samples of BHB were also prepared in a similar manner adding activators as indicated in Table I below, with and without compaction as described above. All the samples were tested for viscosity and fluid loss, and the results are reported in Table I.

TABLE I

| Bentonite | Aged Viscosity 600 rpm | Aged Viscosity 300 rpm | Fluid Loss |
|---|---|---|---|
| Uncompacted BHB | 18 | 11 | 13.6 |
| Uncompacted BHB | 12.5 | 7.5 | 15.1 |
| Uncompacted BHB + 2% $NiCO_3$ | 62 | 54 | 21.0 |
| BHB + 1.5% Soda Ash ($Na_2CO_3$) | 28.5 | 19 | 12.4 |
| BHB + 2% Soda Ash | 22.5 | 15 | 14.8 |
| Compacted BHB + 2% $NiCO_3$ | 290 | 280 | 15.8 |
| Compacted BHB + 1.5% Soda Ash | 37 | 25 | 10.6 |
| Compacted BHB + 2% Soda Ash | 52 | 41 | 9.7 |

The uncompacted BHB in Table I showed a fluid loss of 13.6, when 2% $NiCO_3$ was added, the aged viscosity increased substantially, but the fluid loss increased to 20.2, an undesirable trend. When 2% $NiCO_3$ was added and the sample compacted, the aged viscosity increased more than seventeen fold over the compacted BHB, and the fluid loss valud improved over that of the BHB plus 2% $NiCO_3$ uncompacted sample. The uncompacted samples of BHB with 1.5% and 2% added soda ash gave aged viscosity and fluid loss results which were comparable to each other, and also slightly better than untreated BHB. Compacted BHB having additions of 1.5% and 2% soda ash, and 2% $NiCO_3$ all showed improved aged viscosity characteristics over the uncompacted samples. For example, compacted BHB having 2% soda ash added had aged viscosities of 52 and 41 cps, respectively, compared to 18 and 11 cps for untreated BHB. The fluid loss for this compacted BHB was the lowest recorded; at 9.7. The compacted BHB having 1.5% soda ash added was the next lowest sample in fluid loss value at 10.6.

It can be seen from the above Table I report that significant improvements in both aged viscosity and fluid loss can be obtained using the method of the subject invention. A lower grade clay can be upgraded to meet API specifications of higher grade, more expensive clays, and these upgraded clays are thus useful for additional applications for which they were unsuited prior to the treatment described.

EXAMPLE II

A smectite type clay from Peru was treated with 4.5% soda ash and then compacted. This treated Peruvian clay was compared to the untreated Peruvian clay with the results reported below in Table II.

TABLE II

| Sample | Initial Viscosity | | Fluid Loss |
|---|---|---|---|
| | 600 rpm | 300 rpm | |
| Clay from Peru | 9 | 6 | 28.6 |
| Clay from Peru with 4.5% soda ash, compacted | 32 | 28 | 13.4 |

It can be seen from the above table that the method of the subject invention has substantially improved both the viscosity and fluid loss properties, thereby making the treated Peruvian clay useful in a number of applications for which the untreated clay is not suited.

EXAMPLE III

Even more dramatic results can be seen below in Table III, which compares the results obtained with treated and untreated Dakota Southern (Wyoming calcium bentonite) and Dixie (Mississippi bentonite) clays.

TABLE III

| Performance of Converted Calcium Bentonites | | | |
|---|---|---|---|
| | Initial Viscosity | | |
| | 600 rpm | 300 rpm | Fluid Loss |
| Dakota Southern | 6 | 3 | — |
| Dixie | 5 | 2 | — |
| Dakota Southern + 4.5% soda ash | 9.5 | 6 | 25.4 |
| Dixie + 4% soda ash | 8 | 4.5 | 16.6 |
| Dakota Southern + 4.5% soda ash and compaction | 18 | 13.5 | 14.6 |
| Dakota Southern + 9% soda ash 2× compacted | 23.5 | 13.5 | 12.1 |
| Dixie + 4.5% LiCO₃ 2× compacted | 16.5 | 11.5 | 13.2 |

The above two clays are notoriously below grade in the untreated state, and neither retain any fluid without treatment. The mere addition of 4% and 4.5% soda ash provides some improvement in the properties of these two clays, but the addition of soda ash or lithium carbonate plus compaction upgrades the properties of these two clays substantially. After the treatment of these substandard calcium bentonites, they can be used in foundry moldwash gels, taconite pelletizing, and for oil well drilling muds. Such treated clays can also be expected to be useful in sealing applications such as for slurry trenches, waste disposal sites and landfill containment.

EXAMPLE IV

A bentonite from India was treated according to the process of the subject invention, and compared to the same bentonite, both uncompacted and uncompacted with added activator. The results are reported in Table IV below.

TABLE IV

| Bentonite from India | Initial Viscosity | | Fluid Loss |
|---|---|---|---|
| | 600 rpm | 300 rpm | |
| Uncompacted | 17.5 | 13.5 | 22.5 |
| Uncompacted + 2% Na₂CO₃ | 26 | 22 | 24 |
| Added 3% Na₂CO₃ + Compaction | 89 | 85 | 12 |

The above results show a very substantial increase in initial viscosity for the activated and compacted sample over both the other samples. A very substantial improvement in fluid loss is also evident. The untreated clay from India is not considered useful for the various industrial applications described herein. However, the improved initial viscosity values and substantial reduction in fluid loss observed in the reported tests show that this substandard clay can be upgraded sufficiently to make it acceptable for a wide range of uses.

EXAMPLE V

A low grade bentonite from Milos, Greece, was treated according to the process of the subject invention with the results reported below in Table V.

TABLE V

| Bentonite from Milos, Greece | Initial Viscosity | | Fluid Loss |
|---|---|---|---|
| | 600 rpm | 300 rpm | |
| Uncompacted | 4.0 | 2.5 | — |
| Uncompacted + 4% Na₂CO₃ | 25.5 | 20.5 | 15.4 |
| Added 4% Na₂CO₃ + Compaction | 45.5 | 36.5 | 12.8 |

COMMERCIAL OPERATION

It is, of course, contemplated that large scale mixing and compacting equipment will be used for treating the clays at plant sites conveniently located near the clay deposits. One such commercial scale compactor can be obtained from Allis Chalmers Corporation, West Allis, Wis. A two roll, smooth faced compactor, Model 3230-A, which is capable of developing a maximum force of about 260,000 psi, is the presently preferred equipment for compacting the treated clay on a commercial scale. Other commercial scale mills can also be used, provided that they are capable of developing sufficient compaction pressure to accomplish the desired acceleration of the clay activation and obtain the desired upgrading of the clay. A large granulator mill and vibrator screen is conveniently provided to feed the compactor. Suitable equipment of this type is also available from Allis Chalmers and others.

In the typical process, the clay is received at about 20% moisture, which is the equilibrium moisture attained in the field. The clay is crushed and further drum dried for about 80–90 seconds. The clay is then ground and screened to minus 200 mesh, and transferred along a conveyor where it is sprayed with the activator solution so as to add about 1–10% by weight of the activator salt to the finely divided clay prior to compacting. The clay treated with activator is then fed through the compactor, and is compacted under pressure into a compacted sheet having an apparent density of from about 60–94% of the apparent density of the clay before it is ground. The compacted clay requires no further drying, and is ground and screened to the desired mesh size, and prepared for shipment to the place it is to be used.

Considerable cost savings are realized by locating the clay treating equipment near the clay deposits, performing the upgrading process, and then transporting the upgraded clay to the most proximate locations for use. Until now, many clay deposits could not be used, and considerable shipping costs were incurred to transport higher grade clays from distant locations, for example, Wyoming bentonites have been shipped as far as Australia at great expense. With the subject invention, Australian substandard clays can be upgraded and used locally to replace the Wyoming bentonites at a substantial reduction in transport and handling expenses.

I claim:

1. A method of upgrading a crude smectite clay comprising first adding to said smectite clay 1–10% by weight of an activator substance in a soluble form containing a cation selected from the group consisting of Na, Li, K, Cs, $NH_4$, Zn, Ni, Cu, Co and Fe, said smectite clay having a maximum moisture content of about 20% by weight, thoroughly mixing said activator substance with said clay, and then compacting said clay into a compacted mass having an apparent density of from about 60–94% of the apparent density of the clay before it is ground, whereby the viscosity characteristics and the fluid loss characteristics of said treated clay are substantially improved over the crude clay.

2. The method of claim 1, in which the smectite clay is selected from the group consisting of montmorillonites, nontronites and hectorites of having low grit contents, Black Hills Bentonite, calcium bentonites, and platey-type clays from New Mexico, Argentina, Australia, India, Peru, Mexico, New Zealand, Greece, Brazil, and Canada.

3. The method of claim 1 in which less than about 5% by weight of said activator substance is added to said clay prior to compacting.

4. The method of claim 1, in which the clay is Black Hills Bentonite, and no more than about 2% by weight of said activator substance is added prior to compacting.

5. The method of claim 1, in which the clay is Black Hills Bentonite, and said activator substance comprises about 2% by weight nickel carbonate added prior to compacting.

6. An improved smectite clay derived from a crude clay having an aged viscosity and fluid loss below API standards, said crude clay having substantially improved aged viscosity and decreased fluid loss obtained by the method of claim 1.

7. An improved clay composition obtained by the method of claim 2, said improved clay having a Fann viscosimeter aged viscosity at 600 rpm of at least 15 cps, and a fluid loss of no more than about 15.

8. A clay composition having improved aged viscosity and decreased fluid loss after being modified by the method of claim 1, said clay composition being obtained by treating a crude clay selected from the group consisting of Black Hills Bentonite, New Mexican, Canadian, Australian, Peruvian, Indian, Mexican, Greek and Brazilian bentonites.

9. A converted calcium bentonite clay having an aged viscosity of at least 15 cps and a fluid loss of less than 15, said converted clay having been obtained by the method of claim 1.

10. A method of upgrading a crude smectite clay comprising first adding to said smectite clay 1–10% by weight of an activator substance selected from the group consisting of sodium hydroxide, lithium hydroxide, sodium carbonate, sodium sulfate, potassium carbonate, potassium sulfate, lithium carbonate, lithium sulfate, nickel carbonate, nickel sulfate, ammonium carbonate, magnesium carbonate, magnesium sulfate, cesium carbonate, cesium sulfate, zinc carbonate, zinc sulfate, aluminum carbonate, aluminum sulfate, copper carbonate, copper sulfate, cobalt carbonate, cobalt sulfate, ferric sulfate and sodium chloride, said smectite clay having a maximum moisture content of about 20% by weight, thoroughly mixing said activator substance with said clay, and then compacting said clay into a compacted mass having an apparent density of from about 60–94% of the apparent density of the clay before it is ground, whereby the viscosity characteristics and the fluid loss characteristics of said treated clay are substantially improved over the crude clay.

11. The method of claim 10, in which the smectite clay is selected from the group consisting of montmorillonites, nontronites and hectorites of having low grit contents, Black Hills Bentonite, calcium bentonites, and platey-type clays from New Mexico, Argentina, Australia, India, Peru, Mexico, New Zealand, Greece, Brazil, and Canada.

12. The method of claim 10 in which the activator substance comprises up to about 5% by weight of any one or more of the carbonate salts.

13. The method of claim 10 in which the clay is Black Hills Bentonite, and the activator substance comprises up to about 2% by weight sodium carbonate.

14. The method of claim 10, in which the clay is Black Hills Bentonite, and the activator substance comprises up to about 2% by weight nickel carbonate.

15. An improved smectite clay derived from a crude clay having an aged viscosity and fluid loss below API standards, said crude clay having substantially improved aged viscosity and decreased fluid loss obtained by the method of claim 10.

16. An improved clay composition obtained by the method of claim 11, said improved clay having a Fann viscosimeter aged viscosity at 600 rpm of at least 15 cps, and a fluid loss of no more than about 15.

17. A clay composition having improved aged viscosity and decreased fluid loss after being modified by the method of claim 10, said clay composition being obtained by treated a crude clay selected from the group consisting of Black Hills Bentonite, New Mexican, Australian, Canadian, Peruvian, Indian, Mexican and Greek bentonites.

18. A converted calcium bentonite clay having an aged viscosity of at least 15 cps and a fluid loss of less than 15, said converted clay having been obtained by the method of claim 10.

* * * * *